(12) United States Patent
Gourjon et al.

(10) Patent No.: US 11,528,124 B2
(45) Date of Patent: Dec. 13, 2022

(54) MASKED COMPARISON CIRCUMVENTING COMPRESSION IN POST-QUANTUM SCHEMES

(71) Applicant: NXP B.V., Eindhoven (NL)

(72) Inventors: Marc Gourjon, Hamburg (DE); Joppe Willem Bos, Wijgmaal (BE); Joost Roland Renes, Eindhoven (NL); Tobias Schneider, Graz (AT); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 128 days.

(21) Appl. No.: 17/224,359

(22) Filed: Apr. 7, 2021

(65) Prior Publication Data

US 2022/0337389 A1  Oct. 20, 2022

(51) Int. Cl.
*H04L 9/00* (2022.01)
*H04L 9/30* (2006.01)

(52) U.S. Cl.
CPC ............ *H04L 9/002* (2013.01); *H04L 9/3093* (2013.01); *H04L 2209/043* (2013.01)

(58) Field of Classification Search
CPC .. H04L 9/002; H04L 9/3093; H04L 2209/043
(Continued)

(56) References Cited

U.S. PATENT DOCUMENTS 6,662,336 B1 * 12/2003 Zook ................... H03M 13/158
714/781
10,430,565 B2  10/2019 Moritz et al.
(Continued)

FOREIGN PATENT DOCUMENTS

JP  2003519458 A5 *  2/2008  ............. H04J 13/10
KR  20020074186 A  *  9/2002  ............. H04J 13/10

OTHER PUBLICATIONS

Bhasin, Shivam et al., "Attacking and Defending Masked Polynomial Comparison for Lattice-Based Cryptography." 25 pgs.
(Continued)

*Primary Examiner* — Kambiz Zand
*Assistant Examiner* — Aubrey H Wyszynski

(57) ABSTRACT

Various embodiments relate to a method for securely comparing a first polynomial represented by a plurality of arithmetic shares and a second compressed polynomial represented by a bitstring where the bits in the bitstring correspond to coefficients of the second polynomial, including: performing a first masked shift of the shares of the coefficients of the first polynomial based upon the start of the interval corresponding to the compressed coefficient of the second polynomial and a modulus value; performing a second masked shift of the shares of the coefficients of the first polynomial based upon the end of the interval corresponding to the compressed coefficient of the second polynomial; bitslicing the most significant bit of the first masked shift of the shares coefficients of the first polynomial; bitslicing the most significant bit of the second masked shift of the shares coefficients of the first polynomial; and combining the first bitsliced bits and the second bitsliced bits using an AND function to produce an output including a plurality of shares indicating that the first polynomial would compress to a bitstream matching the bitstream representing the second compressed polynomial.

20 Claims, 1 Drawing Sheet

(58) Field of Classification Search
USPC .......................................................... 713/189
See application file for complete search history.

(56) References Cited

U.S. PATENT DOCUMENTS

| | | | |
|---|---|---|---|
| 10,521,586 B2 | 12/2019 | Berthier et al. | |
| 10,797,722 B2 | 10/2020 | Hars | |
| 2007/0160303 A1* | 7/2007 | Guleryuz | H04N 19/40 |
| | | | 375/E7.129 |

OTHER PUBLICATIONS

Ravi, Prasanna Ravi et al., "Generic Side-channel attacks on CCA-secure lattice-based PKE and KEMs." IACR Transactions on Cryptographic Hardware and Embedded Systems ISSN 2569-2925, vol. 2020, No. 3, pp. 307-335.

Schneider, Tobias et al., "Efficiently Masking Binomial Sampling at Arbitrary Orders for Lattice-Based Crypto." 37 pgs.

Bache, Florian et al., "High-Speed Masking for Polynomial Comparison in Lattice-based KEMs," IACR Transactions on Cryptographic Hardware and Embedded Systems ISSN 2569-2925, vol. 2020, No. 3, pp. 483-507.

Ishai, Yuval et al., "Private Circuits: Securing Hardware against Probing Attacks," 19 pgs.

Rivain, Matthieu et al., "Provabiy Secure Higher-Order Masking of AES." Full version of the paper published in the proceedings of CHES 2010; 19 pgs.

Barthe, Gilles et al., "Masking the GLP Lattice-Based Signature Scheme at Any Order." 52 pgs.

Coron, Jean-Sebastien, "Higher Order Masking of Look-up Tables," University of Luxembourg; 18 pgs.

Oder, Tobias et al., "Practical CCA2-Secure and Masked Ring-LWE implementation." IACR Transactions on Cryptographic Hardware and Embedded Systems ISSN 2569-2925, vol. 2018, No. 1, pp. 142-174.

Reparaz, Oscar et al., "A Masked Ring-LWE Implementation." IACR 2015; 21 pgs.

Beirendonck, Michiel Van, "A Side-channel Resistant Implementation of SABER." 28 pgs.

Bruneau, Nicolas et al., "Multi-variate High-Order Attacks of ShuffledTables Recomputation." International Association for Cryptologic Research 2015: CHES 2015, LNCS 9293, pp. 475-494, 2015.

Lyubashevsky, Vadim et al., "On Ideal Lattices and Learning with Errors Over Rings." Jun. 25, 2013; 34 pgs.

Regev, Oded, "On Lattices, Learning with Errors, Random Linear Codes, and Cryptography," May 2, 2009; 37 pgs.

Computer Security Resource Center; Post Quantum-Cryptography PQC; Created Jan. 3, 2017, updated Jan. 11, 2021; 2 pgs.

Coron, Jean-Sebastien et al., Secure Conversion Between Boolean and Arithmetic Masking of Any Order; 18 pgs.

Bhasin, Shivam et al., "Attacking and Defending Masked Polynomial Comparison for Lattice-Based Cryptography." Jan. 27, 2021, 25 pgs.

Schneider, Tobias et al., "Efficiently Masking Binomial Sampling at Arbitrary Orders for Lattice-Based Crypto." Lecture Notes in Computer Science, vol. 11443, Springer, 2019, pp. 534-564.

Bache, Florian et al., "High-Speed Masking for Polynomial Comparison in Lattice-based KEMs" IACR Transactions an Cryptographic Hardware and Embedded Systems ISSN 2569-2925, vol. 2020, No. 3, pp. 483-507.

Ishai, Yuval et al., "Private Circuits: Securing Hardware against Probing Attacks." Advances in Cryptology—CRYPTO 2003;19 pgs.

Rivain, Matthieu et al., "Provably Secure Higher-Order Masking of AES." Full version of the paper published in the proceedings of CHES 2010; 19 pgs.

Barthe, Gilles et al., "Masking the GLP Lattice-Based Signature Scheme at Any Order." Advances in Cryptology—EUROCRYPT 2018; 52 pgs.

Coron, Jean-Sebastien, "Higher Order Masking of Look-up Tables." University of Luxembourg; EUROCRYPT 2014; 18 pgs.

Reparaz, Oscar et al., "A Masked Ring-LWE Implementation." ICryptographic Hardware and Embedded Systems—CHES 2015; 21 pgs.

Beirendonck, Michiel Van, "A Side-channel Resistant Implementation of SABER." ePrint Arch. 2020; 28 pgs.

Bruneau, Nicolas et al., "Multi-variate High-Order Attacks of ShuffledTables Recomputation." International Association for Cryptologic Research 2015: CHES 2015, LNCS 9293, pp. 475-494.

Coron, Jean-Sebastien et al., Secure Conversion Between Boolean and Arithmetic Masking of Any Order; Cryptographic Hardware and Embedded Systems—CHES 2014; 18 pgs.

U.S. Appl. No. 17/154,116 to Schneider et al., filed Jan. 21, 2021.

* cited by examiner

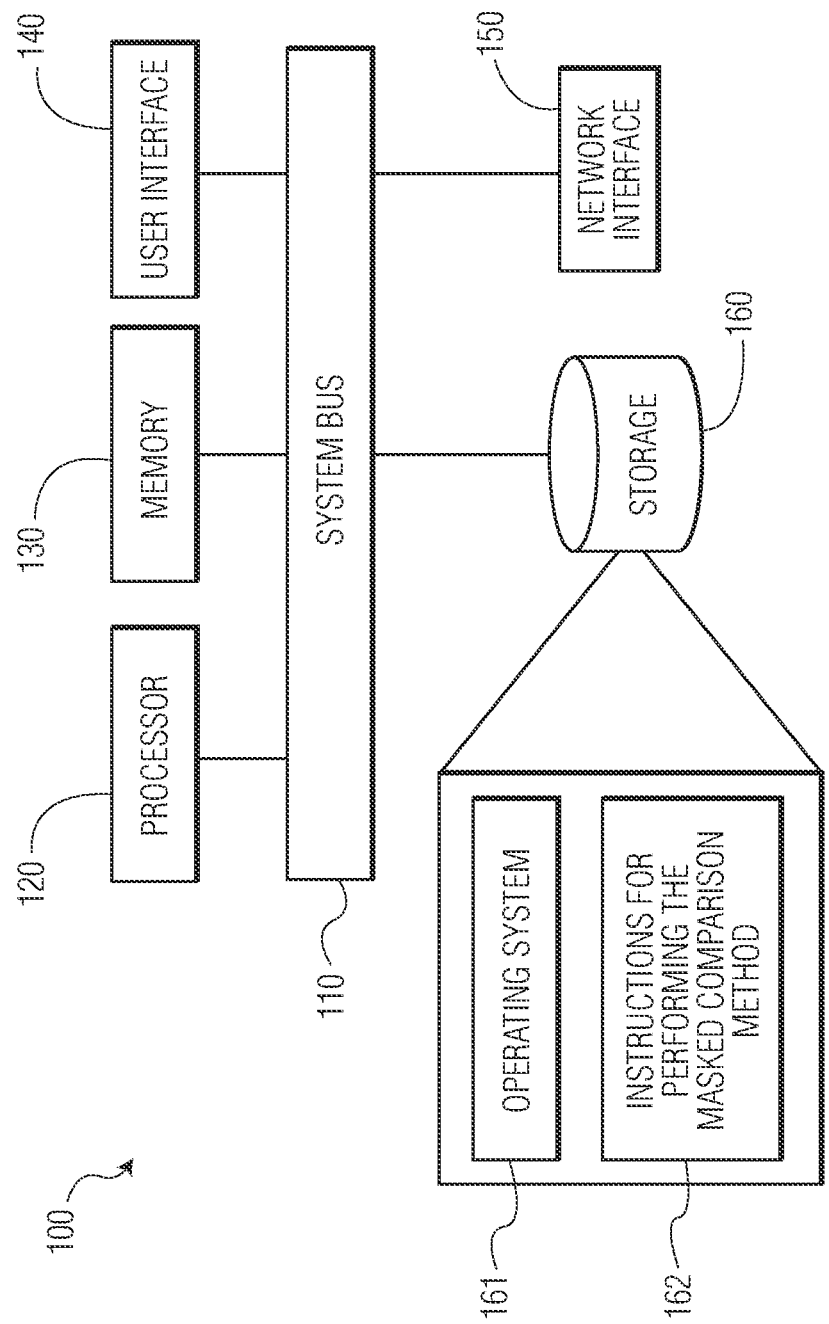

MASKED COMPARISON CIRCUMVENTING COMPRESSION IN POST-QUANTUM SCHEMES

TECHNICAL FIELD

Various exemplary embodiments disclosed herein relate generally to masked comparison avoiding compression in post-quantum schemes. Such a masked comparison may be accomplished under an attack such as an indistinguishability under adaptive chosen ciphertext attack (IND-CCA2)

BACKGROUND

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies, such as the call for proposals for new public-key cryptography standards by the National Institute of Standards and Technology (NIST). The selection procedure for this new cryptographic standard has started and has further accelerated the research of post-quantum cryptography schemes.

There are various families of problems to instantiate these post-quantum cryptographic approaches. Constructions based on the hardness of lattice problems are considered to be promising candidates to become the next standard. A subset of approaches considered within this family are instantiations of the Learning With Errors (LWE) framework: the Ring-Learning With Errors problem. Another subset of approaches are based on recovering a quotient of polynomials in a ring. This means that the operations in these schemes involve arithmetic with polynomials with integer coefficients. Examples of the former include Kyber and NewHope, and examples of the latter include NTRU-HRRS-KEM and Streamlined NTRU Prime.

When implemented, the main arithmetic operations are when computing with polynomials. More precisely, computations are done in a ring $R_q=(\mathbb{Z}/q\mathbb{Z})[X]/(F)=(\mathbb{Z}_q)[X]/(F)$: the coefficients of the polynomial are in $\mathbb{Z}_q$ while the polynomial arithmetic is modulo F.

Several post-quantum cryptographic schemes require the comparison of ciphertexts, which have often been compressed beforehand. One potent type of attack, so-called side-channel analysis, exploits data dependencies in physical measurements of the target device (e.g., power consumption) and can be thwarted with the help of masking the processed data. There have been previous approaches to mask the compression and comparison steps separately. However, the masked compression in particular suffers from a significant performance overhead.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for securely comparing a first polynomial represented by a plurality of arithmetic shares and a second compressed polynomial represented by a bitstring where the bits in the bitstring correspond to coefficients of the second polynomial, including: performing a first masked shift of the shares of the coefficients of the first polynomial based upon the start of the interval corresponding to the compressed coefficient of the second polynomial and a modulus value; performing a second masked shift of the shares of the coefficients of the first polynomial based upon the end of the interval corresponding to the compressed coefficient of the second polynomial; bitslicing the most significant bit of the first masked shift of the shares coefficients of the first polynomial; bitslicing the most significant bit of the second masked shift of the shares coefficients of the first polynomial; and combining the first bitsliced bits and the second bitsliced bits using an AND function to produce an output including a plurality of shares indicating that the first polynomial would compress to a bitstream matching the bitstream representing the second compressed polynomial.

Various embodiments are described, wherein performing a first masked shift of the shares of the coefficients of the first polynomial further includes: calculating $$x_i = a_i, \text{ and}$$

$$x_i^{(0)} = (x_i^{(0)} + 2^{\lceil \log_2(q) \rceil - 1} - s) \bmod q$$

where $a_i$ is the arithmetic shares of the ith coefficient of the first polynomial a, q is the modulus, and s is the start of the interval of values compressing to bit values in $b_i$ associated with the ith coefficient of the compressed polynomial.

Various embodiments are described, wherein performing a second masked shift of the shares of the coefficients of the first polynomial further includes: calculating $$y_i = a_i, \text{ and}$$

$$y_i^{(0)} = (y_i^{(0)} - e) \bmod q$$

where e is the end of the interval of values compressing to bit values in b associated with the ith coefficient of the compressed polynomial.

Various embodiments are described, further including: calculating $$\hat{x}_i = A2B(x_i) \text{ and}$$

$$\hat{y}_i = A2B(y_i),$$

where the function A2B converts arithmetic shares of the input into Boolean shares, $\hat{x}_i$ is the Boolean shared first masked shift of the coefficients of the first polynomial, and $\hat{y}_i$ is the Boolean shared second masked shift of the coefficients of the first polynomial.

Various embodiments are described, wherein
bitslicing the most significant bit of the first masked shift of the shares coefficients of the
first polynomial includes calculating $$\hat{x}_i = \text{sharewiseLSR}(\hat{x}_i, \lceil \log_2(q) \rceil - 1), \text{ and}$$

bitslicing the most significant bit of the second masked shift of the shares coefficients of the first polynomial includes calculating $$\hat{y}_i = \text{sharewiseLSR}(\hat{y}_i, \lceil \log_2(q) \rceil - 1),$$

where the function sharewiseLSR(z, l) performs a right shift of l bits of z on each share of z.

Various embodiments are described, further including: calculating $$\hat{t}_x = \{0, \ldots, 0\},$$

$$\hat{t}_y = \{0, \ldots, 0\}.$$

calculating for all values of j from 0 to k−1

$$\hat{t}_x = \text{sharewiseOR}(\hat{t}_x, \text{sharewiseLSL}(\hat{x}_{k \cdot i+j}, j)), \text{ and}$$

$$\hat{t}_y = \text{sharewiseOR}(\hat{t}_y, \text{sharewiseLSL}(\hat{y}_{k \cdot i+j}, j))$$

where $\hat{t}_x$ is a first temporary variable, $\hat{t}_y$ is a second temporary variable, j is an index, k is the number of coefficients processed in parallel, i is an index value, sharewiseOR is a function that performs a bitwise OR on the shares of the inputs, and the function sharewiseLSL(z, l) performs a left shift of l bits of z on each share of z.

Various embodiments are described, wherein combining the first bitsliced bits and the second bitsliced bits further includes:
calculating for all values of j from 0 to k−1

$$\hat{c} = \text{maskedAND}(\hat{c}, \text{maskedAND}(\hat{t}_x, \hat{t}_y))$$

where $\hat{c}$ is the shared output indicating that the first polynomial would compress to a bitstream matching the bitstream representing the second compressed polynomial and the function maskedAND performs a masked bitwise AND of the inputs.

Various embodiments are described, wherein combining the first bitsliced bits and the second bitsliced bits further includes repeatedly ANDing the upper and lower bits of each the shares of $\hat{c}$ together until a single bit per share results.

Various embodiments are described, wherein combining the first bitsliced bits and the second bitsliced bits further includes ANDing all of the bits of each of the shares of $\hat{c}$ together until a single bit per share results.

Various embodiments are described, wherein the modulus is a prime number.

Further various embodiments relate to a data processing system including instructions embodied in a non-transitory computer readable medium, the instructions for securely comparing a first polynomial represented by a plurality of arithmetic shares and a second compressed polynomial represented by a bitstring where the bits in the bitstring correspond to coefficients of the second polynomial to perform a cryptographic operation in a processor, the instructions, including: instructions for performing a first masked shift of the shares of the coefficients of the first polynomial based upon the start of the interval corresponding to the compressed coefficient of the second polynomial and a modulus value; instructions for performing a second masked shift of the shares of the coefficients of the first polynomial based upon the end of the interval corresponding to the compressed coefficient of the second polynomial; instructions for bitslicing the most significant bit of the first masked shift of the shares coefficients of the first polynomial; instructions for bitslicing the most significant bit of the second masked shift of the shares coefficients of the first polynomial; and instructions for combining the first bitsliced bits and the second bitsliced bits using an AND function to produce an output including a plurality of shares indicating that the first polynomial would compress to a bitstream matching the bitstream representing the second compressed polynomial.

Various embodiments are described, wherein instructions for performing a first masked shift of the shares of the coefficients of the first polynomial further includes: instructions for calculating $$x_i = a_i, \text{ and}$$

$$x_i^{(0)} = (x_i^{(0)} + 2^{\lceil \log 2(q) \rceil - 1} - s) \bmod q \qquad 2.$$

where $a_i$ is the arithmetic shares of the ith coefficient of the first polynomial a, q is the modulus, and s is the start of the interval of values compressing to bit values in $b_i$ associated with the ith coefficient of the compressed polynomial.

Various embodiments are described, wherein instructions for performing a second masked shift of the shares of the coefficients of the first polynomial further includes:
instructions for calculating $$y_i = a_i, \text{ and}$$

$$y_i^{(0)} = (y_i^{(0)} - e) \bmod q$$

where e is the end of the interval of values compressing to bit values in b associated with the ith coefficient of the compressed polynomial.

Various embodiments are described, further including: instructions for calculating $$\hat{x}_i = A2B(x_i) \text{ and}$$

$$\hat{y}_i = A2B(y_i),$$

where the function A2B converts arithmetic shares of the input into Boolean shares, $\hat{x}_i$ is the Boolean shared first masked shift of the coefficients of the first polynomial, and $\hat{y}_i$ is the Boolean shared second masked shift of the coefficients of the first polynomial.

Various embodiments are described, wherein instructions for bitslicing the most significant bit of the first masked shift of the shares coefficients of the first polynomial includes instructions for calculating $$\hat{x}_i = \text{sharewiseLSR}(\hat{x}_i, [\log_2(q)] - 1), \text{ and}$$

instructions for bitslicing the most significant bit of the second masked shift of the shares coefficients of the first polynomial includes instructions for calculating $$\hat{y}_i = \text{sharewiseLSR}(\hat{y}_i, [\log_2(q)] - 1),$$

where the function sharewiseLSR(z, l) performs a right shift of l bits of z on each share of z.

Various embodiments are described, further including: instructions for calculating $$\hat{t}_x = \{0, \ldots, 0\},$$

$$\hat{t}_y = \{0, \ldots, 0\}.$$

instructions for calculating for all values of j from 0 to k−1

$$\hat{t}_x = \text{sharewiseOR}(\hat{t}_x, \text{sharewiseLSL}(\hat{x}_{k \cdot i+j}, j)), \text{ and}$$

$$\hat{t}_y = \text{sharewiseOR}(\hat{t}_y, \text{sharewiseLSL}(\hat{y}_{k \cdot i+j}, j))$$

where $\hat{t}_x$ is a first temporary variable, $\hat{t}_y$ is a second temporary variable, j is an index, k is the number of coefficients processed in parallel, i is an index value, sharewiseOR is a function that performs a bitwise OR on the shares of the inputs, and the function sharewiseLSL(z, l) performs a left shift of l bits of z on each share of z.

Various embodiments are described, wherein instructions for combining the first bitsliced bits and the second bitsliced bits further includes:
instructions for calculating for all values of j from 0 to k−1

$$\hat{c} = \text{maskedAND}(\hat{c}, \text{maskedAND}(\hat{t}_x, \hat{t}_y))$$

where ĉ is the shared output indicating that the first polynomial would compress to a bitstream matching the bitstream representing the second compressed polynomial and the function maskedAND performs a masked bitwise AND of the inputs.

Various embodiments are described, wherein instructions for combining the first bitsliced bits and the second bitsliced bits further includes instructions for repeatedly ANDing the upper and lower bits of each the shares of ĉ together until a single bit per share results.

Various embodiments are described, wherein instructions for combining the first bitsliced bits and the second bitsliced bits further includes instructions for ANDing all of the bits of each of the shares of ĉ together until a single bit per share results.

Various embodiments are described, wherein the modulus is a prime number.

BRIEF DESCRIPTION OF THE DRAWINGS

In order to better understand various exemplary embodiments, reference is made to the accompanying drawings, wherein:

FIG. 1 illustrates an exemplary hardware diagram for implementing the masked comparison method.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The decapsulation operation of a Key Encapsulation Mechanism (KEM) extracts an encapsulated key from a given ciphertext using a secret key. If this secret key is leaked, it would invalidate the security properties provided by the KEM. It has been shown that unprotected implementations of post-quantum schemes are vulnerable to implementation attacks, e.g., side-channel analysis. In particular, it was demonstrated that the secret key can be extracted from physical measurements of key-dependent parts in the decapsulation operation. For several post-quantum KEMs, these key-dependent parts include a compression of polynomials with a subsequent check for equality with compressed public polynomials. Furthermore, the ciphertext indistinguishability (IND-CCA2) security property, i.e., security under adaptively chosen known ciphertext attacks, requires the intermediate results of this comparison to remain confidential, i.e., it should not be leaked if parts of the comparison is true. Therefore, a secure implementation of these KEMs requires the integration of dedicated countermeasures for both the compression and comparison steps. The specific problem to be solved is to compare a first polynomial represented using a plurality of arithmetic shares to a second polynomial represented in a compressed form. That is, if the shares of the first polynomial were combined and then compressed, would its compressed form be identical to the compressed form of the second polynomial.

Masking is a common countermeasure to thwart side-channel analysis and has been utilized for various applications. Besides security, efficiency is also an important aspect when designing a masked algorithm. Important metrics for software implementations of masking are the number of operations and the number of fresh random elements required for the masking scheme.

The first dedicated masking scheme for the compression was presented in Oscar Reparaz, Sujoy Sinha Roy, Frederik Vercauteren, and Ingrid Verbauwhede, *A masked ring-lwe implementation*, Cryptographic Hardware and Embedded Systems—CHES 2015—17th International Workshop, Saint-Malo, France, Sep. 13-16, 2015, Proceedings (Tim Güneysu and Helena Handschuh, eds.), Lecture Notes in Computer Science, vol. 9293, Springer, 2015, pp. 683-702 (hereinafter Reparaz). In their case, the values in $\mathbb{Z}_q$, q=7681, were compressed to one bit using a probabilistic table-based approach. It is not usable for the targeted schemes in this disclosure, as it introduces a non-negligible failure probability, a high performance overhead, and does not output masked values, which means that in cannot be used as a prior step for a masked comparison.

Another solution for masked compression was presented in Tobias Oder, Tobias Schneider, Thomas Pöppelmann, and Tim Güneysu, *Practical cca2-secure and masked ring-lwe implementation*, IACR Trans. Cryptogr. Hardw. Embed. Syst. 2018 (2018), no. 1, 142-174 (hereinafter Oder). In contrast to Reparaz, Oder does not increase the failure rate, produces masked outputs and does not require a large table. Still, it is only applicable to compression of one bit, which makes it unusable for any multi-bit ciphertext compression, as used in many post-quantum schemes.

Prior to the embodiments described herein, the only known secure approach for multi-bit compression with arbitrary moduli was to rely on a generic table-based method, where the compression is implemented as an S-box. The most efficient and secure approach has been proposed in Jean-Sébastien Coron, *Higher order masking of look-up tables*, Advances in Cryptology—EUROCRYPT 2014—33rd Annual International Conference on the Theory and Applications of Cryptographic Techniques, Copenhagen, Denmark, May 11-15, 2014. Proceedings (Phong Q. Nguyen and Elisabeth Oswald, eds.), Lecture Notes in Computer Science, vol. 8441, Springer, 2014, pp. 441-458 (hereinafter Coron). The main drawbacks are that it requires multiple tables whose size depends on the modulus used, and it can introduce a high performance overhead especially for large moduli. In addition, it has shown that this table-based approach suffers especially at higher orders from attacks that exploit multiple points in time.

An efficient solution for moduli which are a power of two was proposed in Michiel Van Beirendonck, Jan-Pieter D'Anvers, Angshuman Karmakar, Josep Balasch, and Ingrid Verbauwhede, *A side-channel resistant implementation of SABER*, IACR Cryptol. ePrint Arch. 2020 (2020), 733 (hereinafter Van Beirendonck). In this special case compression can be implemented by an Arithmetic-to-Arithmetic conversion (A2A). The publication is restricted to first order security and cannot be straightforwardly applied to PQC schemes with prime moduli, e.g. KYBER. The embodiments described herein may be applied to arbitrary moduli, especially for prime moduli for which no solution (except the generic table based approach) exist to date.

For the masked comparison of two polynomials, a first solution was presented in Oder. The authors propose to utilize a hash function and construct a specialized solution for a particular KEM at a low protection order. It has only limited applicability due to the low protection An alternative approach was presented in Gilles Barthe, Sonia Belaïd, Thomas Espitau, Pierre-Alain Fouque, Benjamin Grégoire, Mélissa Rossi, and Mehdi Tibouchi, *Masking the GLP lattice-based signature scheme at any order*, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384. While the original publication is dedicated to the protection of lattice-based signature schemes (and not KEMs), the idea of using special mask conversion algorithms for comparison can be easily translated to the case of KEMs. In contrast to Oder, their solution can be instantiated at various protection orders, but still introduces a significant overhead in both number of operations and of fresh random elements.

Most recently in Florian Bache, Clara Paglialonga, Tobias Oder, Tobias Schneider, and Tim Güneysu, *High-speed masking for polynomial comparison in lattice-based kems*, IACR Trans. Cryptogr. Hardw. Embed. Syst. 2020 (2020), no. 3, 483-507 (hereinafter Bache), a more efficient approach was presented which is based on the idea of batching the comparison of multiple coefficients of the polynomials. In this way, a significantly faster comparison of the complete polynomial can be achieved.

Improving on Bache, U.S. patent application Ser. No. 17/154,116 filed on Jan. 21, 2021, (hereinafter prior application), which is incorporated herein by reference for all purposes, provides an even more efficient and secure comparison algorithm. However, both Bache and the prior application rely on a specific assumption about the input distribution. Very recently in Shivam Bhasin, Jan-Pieter D'Anvers, Daniel Heinz, Thomas Pöppelmann, and Michiel Van Beirendonck, *Attacking and defending masked polynomial comparison for lattice-based cryptography*, Cryptology ePrint Archive, Report 2021/104, 2021, https://eprint.iacr.org/2021/104, it has been shown that this assumption is not true for some PQC schemes and, therefore, these solutions cannot be used as a masked comparison for, e.g., KYBER.

All these works cannot be straightforwardly applied to post-quantum cryptography (PQC) schemes which compare compressed public polynomials without a securely masked method for compression of polynomials to multiple bits.

The embodiments described herein disclose an approach that avoids the need to implement the masked compression step entirely, and enables the secure and efficient implementation of such schemes which use ciphertext compression. These embodiments improve on the state-of-the-art enabling a significantly more efficient implementation of post-quantum schemes which include the comparison of compressed polynomials. This is achieved by avoiding the costly multi-bit compression steps entirely, and rather integrate a decompression step into the masked comparison. It reduces both the number of operations and the number of random elements, while not necessarily requiring the storage of large tables as in the table-based approach. Informally, the embodiments provide an algorithm to check whether a given masked non-compressed polynomial would be compressed to a given compressed value, without performing the compression. Hence, the masked comparison method disclosed herein improves the operation of secure systems and the operation of computer systems implementing various security protocols.

The embodiments described herein propose a new way of performing a comparison of compressed polynomials which avoids the initial compression entirely. In particular, instead of comparing compressed byte sequences, the new approach checks whether a polynomial coefficient would be compressed into the correct bitstring without performing the compression explicitly. This is achieved by checking whether the coefficient is contained in the interval of values which compresses to the correct bits. Therefore, the costly masked compression step can be completely avoided for protected implementations of such schemes, which helps to reduce both the total number of operations and random elements compared to prior art that would combine a masked compression with a masked comparison algorithm.

Let $f \in \mathbb{Z}_q[X]$ be a polynomial of degree (at most) $m-1$: i.e., $f(X) = \sum_{j=0}^{m-1} x_j X^j$ where $x=(x_0, \ldots, x_{m-1})$ is denoted as the sequence of the coefficients of this polynomial $f(X)$. An arithmetic sharing of a polynomial x is written as x consisting of n arithmetic shares $x^{(i)} = (x_0^{(i)}, \ldots, x_{m-1}^{(i)}) \in \mathbb{Z}_q^m$, $0 \leq i < n$ such that $$f(X) = \sum_{j=0}^{m-1}\sum_{i=0}^{n-1} x_j^{(i)} X^j \equiv \sum_{j=0}^{m-1} x_j X^j \pmod{q}.$$

A Boolean sharing of some value $x \in \mathbb{F}_{2^k}$ is written as $\hat{x}$ consisting of n Boolean shares $\hat{x}^{(i)}$ such that $$x = \bigoplus_{i=0}^{n-1} \hat{x}^{(i)}.$$

The goal of the embodiments described herein is to compare a masked input polynomial to a sequence of public compressed polynomial coefficients where:
  a: The polynomial a is secret and should not be leaked to the attacker. Therefore, it is stored and processed in n arithmetic shares. The sharing of a is denoted as a.
  $b=(b_0, \ldots, b_{m-1})$: The bitstring of compressed polynomial coefficients is public and does not need to be protected. Therefore, the compressed coefficients are stored and processed in plain. The layout of b does not matter since all valid compression schemes allow the reconstruction of $b_i$ given b and this invention enables the performance of the respective operations without side-channel protection.

An output c is set to 1 if the polynomial a compresses to b, which means that all coefficients $a_i$ get compressed to the same value as in the corresponding $b_i$. Otherwise, the output is set to 0. Hence, $$c = \begin{cases} 1 & \text{if compress}\left(\sum_{i=0}^{n-1} a_j^{(i)} \mod q\right) = b_j \text{ for } 0 \leq j < m, \\ 0 & \text{otherwise} \end{cases}$$

This value c is secret and should not be leaked during the computation of the comparison. Therefore, it is stored and processed in n Boolean shares, written as c=ĉ.

Embodiments of a masked comparison of polynomials without compression will now be described in greater detail. The masked comparison is highly optimized to provide both good performance (i.e., a low number of operations and required random elements) and sufficient protection against side-channel analysis. The masked comparison may be adapted to fit various use cases with the following parameters:

- n: The number of shares used in the sharing of the secret polynomial. Increasing this value will improve the side-channel security, but also lower the performance of the comparison.
- m: This indicates the degree of the polynomials, respectively the number of coefficients, which should be compared. Usually, this is fixed and provided by the parameter set of the cryptographic algorithm used.
- $\mathcal{D}$: The domain of compressed polynomial coefficients. Usually, this is fixed by the use case. In previous approaches increasing domains impact efficiency of compression significantly (e.g., table based), while this approach has similar performance across all domains $\mathcal{D}$.
- S(b) and E(b): Functions to determine the interval bounds in $\mathbb{Z}_q$ for which a coefficient would be compressed to b. S(b) returns the smallest value of the interval, and E(b) returns the largest value of the interval plus one. The interval bounds are fixed by the use case, i.e., the compression algorithm that is used. A table-based approach or branching computation may be used to compute the bounds because the presented algorithm does not require b to remain secret and therefore no side-channel protections are needed. The masked comparison may be adapted to non-continuous intervals.
- k: The comparison may be performed for k coefficients in parallel to improve performance and randomness requirements. If at least one of these comparisons indicates a difference, the output c is set to 0. The parameter k needs to be set carefully depending on the use case. For simplicity the masked comparison process described below presents the case where k is a power of 2 and m a multiple of k. The masked comparison may be applicable to cases where k does not fulfil these properties. Increasing k allows for significantly improved performance.
- maskedAND: The function maskedAND: $\mathbb{F}_{2^m}{}^n \times \mathbb{F}_{2^m}{}^n \mapsto \mathbb{F}_{2^m}{}^n$ computes the bit-wise AND of two given Boolean-shared inputs in a masked fashion. The embodiments described herein are independent of the actual implementation of this function and may utilize any of the existing solutions (e.g., Yuval Ishai, Amit Sahai, and David A. Wagner, *Private circuits: Securing hardware against probing attacks*, Advances in Cryptology—CRYPTO 2003, 23rd Annual International Cryptology Conference, Santa Barbara, Calif., USA, Aug. 17-21, 2003, Proceedings (Dan Boneh, ed.), Lecture Notes in Computer Science, vol. 2729, Springer, 2003, pp. 463-481.), as long as it provides the desired security.
- sharewiseAND: The function sharewiseAND: $\mathbb{F}_{2^m}{}^n \times \mathbb{F}_{2^m}{}^1 \mapsto \mathbb{F}_{2^m}{}^n$ computes the bit-wise AND of a given Boolean-shared input with a non-shared value. This is achieved by computing the bit-wise AND of each share separately with the non-shared value.

The algorithm requires that the size of the largest interval be smaller than or equal to the difference of the modulus to the next smaller power of two, i.e., $q-2^{\lceil \log_2(q)\rceil-1}$. For example, this requirement is fulfilled for the KEM Kyber with the following parameters:

Difference to power of two: $3329-2^{12-1}=1281$

Interval size 1: 4<1281

Interval size 2: 2<1281

Interval size 3: 209<1281

Interval size 4: 105<1281

Given these requirements, the comparison is always correct and works for prime as well as for non-prime moduli q. If the requirement is not fulfilled, the masked comparison method may be adapted to process more MSBs to decide if the value lies in the target interval. This is correct because each coefficient $a_i$ is arithmetically shifted by the interval bounds corresponding to $b_i$ such that bit $[\log_2(q)]-1$ is set whenever the coefficient is greater, respectively smaller, than the bound. The resulting bits are efficiently combined into a single bit in the remainder of the masked comparison method. Initially, output ĉ is set to a fresh masking of 1 using a function refresh. The masked comparison method is independent of specific implementations of refresh and a function maskedAND as long as the desired security is reached. Existing applicable solutions are described in Gilles Barthe, Sonia Belaïd, Thomas Espitau, Pierre-Alain Fouque, Benjamin Grégoire, Mélissa Rossi, and Mehdi Tibouchi, *Masking the GLP lattice-based signature scheme at any order*, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384. A conversion from arithmetic sharing to Boolean sharing is required (A2B); multiple solutions with adequate performance and security are available, e.g. in Tobias Schneider, Clara Paglialonga, Tobias Oder, and Tim Güneysu, *Efficiently masking binomial sampling at arbitrary orders for lattice-based crypto*, Public-Key Cryptography—PKC 2019—22nd IACR International Conference on Practice and Theory of Public-Key Cryptography, Beijing, China, Apr. 14-17, 2019, Proceedings, Part II (Dongdai Lin and Kazue Sako, eds.), Lecture Notes in Computer Science, vol. 11443, Springer, 2019, pp. 534-564. The conversion transforms n arithmetic shares $x^{(i)}$ into n Boolean shares $\hat{x}^{(i)}$ such that $\Sigma_{i=0}^{n-1} x^{(i)} \bmod q \equiv x = \oplus_{i=0}^{n-1} \hat{x}^{(i)}$.

The invention provides resistance against side-channel attacks by operating on masked data and the level of security may be adapted by increasing the number n of shares. Side-channel security is achieved because the masked comparison method never reconstructs the confidential values and instead involves masked operations. These protections establish the confidentiality of the key-dependent polynomial a and the comparison output ĉ that is required to achieve the security guarantees of the KEM, including IND-CCA2 security in presence of side-channel attacks.

An embodiment of the masked comparison method is demonstrated below using pseudo code.

```
Input: An arithmetic sharing α of a polynomial α ∈ ℤ_q[X] and a bitstring b of compressed
polynomial coefficients b_0, ..., b_{m-1} ∈ 𝒟.
Output: A Boolean sharing ĉ of c where c = 1 iff α compresses to b, otherwise c = 0.
 1:  ĉ = refresh({1, 0, ..., 0})
 2:  for i = 0 to m − 1 do            Interval comparison for specific b_i.
 3:     s = S(b_i)                    Start of interval in ℤ_q compressing to b_i.
 4:     e = E(b_i)                    (End of interval in ℤ_q compressing to b_i) + 1.
 5:     x_i = a_i
 6:     y_i = a_i
 7:     x_i^(0) = (x_i^(0) + 2^{⌈log_2(q)⌉−1} − s) mod q    Masked shift by interval bound.
 8:     y_i^(0) = (y_i^(0) − e) mod q
 9:     x̂_i = A2B(x_i)
10:     ŷ_i = A2B(y_i)
11:     x̂_i = sharewiseLSR(x̂_i, ⌈log_2(q)⌉ − 1)
12:     ŷ_i = sharewiseLSR(ŷ_i, ⌈log_2(q)⌉ − 1)
13:  for i = 0 to m/n − 1 do          Comparison of k coefficients in parallel.
14:     t̂_x = {0, ..., 0}
15:     t̂_y = {0, ..., 0}
16:     for j = 0 to k − 1 do
17:        t̂_x = sharewiseOR (t̂_x, sharewiseLSL(x̂_{k·i+j}, j))
18:        t̂_y = sharewiseOR (t̂_y, sharewiseLSL(ŷ_{k·i+j}, j))
19:     ĉ = maskedAND (ĉ, maskedAND(t̂_x, t̂_y))
20:     for i = log_2(k) − 1 to 0 do  Reduction from k bits to a single bit.
21:        ĥ = sharewiseLSR(ĉ, 2^i)
22:        ĉ = sharewiseAND (ĉ, 2^{2^i} − 1)
23:        ĉ = maskedAND(ĉ, ĥ)
24:  return ĉ
```

The method begins by initializing the shares of the output ĉ so that c=1, which indicates that the input polynomial a matches the compressed polynomial coefficients b. Accordingly, the method will set the shares of the output ĉ so that c=0 when it finds that the input polynomial a if it were compressed does not match the compressed polynomial coefficients b. At steps 2 to 12, the masked comparison method performs an interval comparison for each specific $b_i$. The purposes of these steps is to shift the coefficient values using the start and end of the interval corresponding to the received $b_i$ values in masked manner so that the most significant bits of the shifted values indicate if each of the shares would result in the correct compression. The variables $x_i$ and $y_i$ are initialized to the coefficient shares $a_i$. The variable $x_i$ is then offset by the starting interval corresponding to $b_i$ and the value $2^{\lceil \log_2(q) \rceil - 1}$ at step 7. The variable $x_i$ is then offset by the ending interval corresponding to $b_i$ at step 8. At steps 9 and 10 an A2B function is applied to $x_i$ and $y_i$ to produce Boolean shares $\hat{x}_i$ and $\hat{y}_i$ at steps 9 and 10. The sharewiseLSR function shifts each of $\hat{x}_i$ and $\hat{y}_i$ right by $\lceil \log_2(q) \rceil - 1$ bits at steps 11 and 12 this results in the shifting the most significant bit (MSB) to becoming the least significant bit (LSB).

In order to arrive at the final shared value ĉ all of the single bits that indicate if the share is in the proper interval from each shifted share need to be combined by ANDing them together. As a result if any of the bits are 0 indicating that the mapping would not be correct, it will result in the final value being 0. Steps 13 to 19 perform a bitslicing operation that slices the bits of interest and then combines them resulting in k bits for each share. Then steps 20 to 23 repetitively AND the upper and lower halves of the k bits for each share until a single bit results for each share. This implementation assumes that k is a power of 2. At step 13, a loop is initialized that operates over $$\frac{m}{k}$$

iterations. Each iteration slices k bits of the Boolean shares $\hat{x}_i$ and $\hat{y}_i$ for combining. At steps 14 and 15, $\hat{t}_x$ and $\hat{t}_y$ are initialized. Then at steps 17 and 18 the values $\hat{t}_x$ and $\hat{t}_y$ are updated by performing a left shift of j bits on segments of $\hat{x}_i$ and $\hat{y}_i$, respectively and ORing the shares together using the sharewiseOR function. The sharewiseOR function performs a bitwise OR of the different shares of the different inputs. Once all of the bits have been sliced and concatenated, then at step 19, $\hat{t}_x$ and $\hat{t}_y$ combined using the maskedAND function. This result is then further combined with ĉ using the maskedAND function to produce an updated value of ĉ.

Steps 20 to 23 reduce the value of each share of ĉ from k bits to one bit per share. At step 21 the value ĥ is set to ĉ shifted right by $2^i$ bit using the sharewiseLSR function. This effectively selects the upper half of ĉ. The value ĉ is then updated by using the sharewiseAND function with ĉ and $2^{2^i} - 1$ as inputs and that effectively selects the lower half of ĉ. Finally, ĉ is updated using the maskedAND function with ĉ and ĥ as inputs that resulting in the masked computation of the AND of the upper and lower half of the sensitive value c. This is repeated until a single bit value results for each share of ĉ. Finally, the value of ĉ is returned.

The compression approach taken in Van Beirendonck is quite efficient, but restricted to power-of-two moduli. In addition, the comparison method used is only defined to first order security. Therefore, in contrast to this invention their approach cannot be straightforwardly applied to PQC schemes with non-power-of-two moduli at arbitrary security orders.

The same functionality as in this invention can be achieved by combining a generic table-based approach for compression with a subsequent comparison of compressed polynomials such as using for example Coron and Barthe. The generic table-based approach can be used to perform a secure compression to multiple-bits. But it is impractical for PQC schemes as it requires tables depending on the number of shares and the size of the moduli. For example, for KYBER with q=3329, a straightforward approach requires multiple tables with $2^{12}$ entries, as well as a high amount of randomness.

A secure approach for a subsequent masked comparison can found in Barthe where every compressed polynomial is converted to Boolean shares, securely XORed with the reference and a masked logical disjunction over all resulting bits is performed. This approach results in a significant performance penalty as it involves for each coefficient one Arithmetic-to-Boolean conversion (A2B) and multiple conjunctions on multiple bits.

In contrast, masked comparison methods disclosed herein may be instantiated without any pre-computed tables depending on how the A2B conversion, S(b) and E(b) are implemented. Furthermore, masked comparison method is significantly more efficient since it requires only the comparison of two bits per coefficient that is amenable to bitslicing, whereas the mentioned approach involves the comparison of multiple bits per coefficient (e.g. 11 bits in the case of KYBER-1024).

FIG. 1 illustrates an exemplary hardware diagram 100 for implementing the masked comparison method. As illustrated, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), field programmable gate array (FPGA), application-specific integrated circuit (ASIC), or other similar devices.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user as needed. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 162 may include instructions for implementing the mask comparison method described above.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A method for securely comparing a first polynomial represented by a plurality of arithmetic shares and a second compressed polynomial represented by a bitstring where the bits in the bitstring correspond to coefficients of the second polynomial, comprising:

performing a first masked shift of the shares of the coefficients of the first polynomial based upon the start of the interval corresponding to the compressed coefficient of the second polynomial and a modulus value;

performing a second masked shift of the shares of the coefficients of the first polynomial based upon the end of the interval corresponding to the compressed coefficient of the second polynomial;

bitslicing the most significant bit of the first masked shift of the shares coefficients of the first polynomial;

bitslicing the most significant bit of the second masked shift of the shares coefficients of the first polynomial; and combining the first bitsliced bits and the second bitsliced bits using an AND function to produce an output including a plurality of shares indicating that the first polynomial would compress to a bitstream matching the bitstream representing the second compressed polynomial.

2. The method of claim 1, wherein performing a first masked shift of the shares of the coefficients of the first polynomial further comprises:

calculating $$x_i = a_i, \text{ and}$$

$$x_i^{(0)} = (x_i^{(0)} + 2^{\lceil \log_2(q) \rceil - 1} - s) \bmod q$$

where $a_i$ is the arithmetic shares of the $i^{th}$ coefficient of the first polynomial a, q is the modulus, and s is the start of the interval of values compressing to bit values in $b_i$ associated with the $i^{th}$ coefficient of the compressed polynomial.

3. The method of claim 2, wherein performing a second masked shift of the shares of the coefficients of the first polynomial further comprises:

calculating $$y_i = a_i, \text{ and}$$

$$y_i^{(0)} = (y_i^{(0)} - e) \bmod q$$

where e is the end of the interval of values compressing to bit values in b associated with the $i^{th}$ coefficient of the compressed polynomial.

4. The method of claim 3, further comprising:

calculating $$\hat{x}_i = A2B(x_i) \text{ and}$$

$$\hat{y}_i = A2B(y_i),$$

where the function A2B converts arithmetic shares of the input into Boolean shares, $\hat{x}_i$ is the Boolean shared first masked shift of the coefficients of the first polynomial, and $\hat{y}_i$ is the Boolean shared second masked shift of the coefficients of the first polynomial.

5. The method of claim 4, wherein bitslicing the most significant bit of the first masked shift of the shares coefficients of the first polynomial includes calculating $$\hat{x}_i = \text{sharewiseLSR}(\hat{x}_i, \lceil \log_2(q) \rceil - 1), \text{ and}$$

bitslicing the most significant bit of the second masked shift of the shares coefficients of the first polynomial includes calculating $$\hat{y}_i = \text{sharewiseLSR}(\hat{y}_i, \lceil \log_2(q) \rceil - 1),$$

where the function sharewiseLSR(z, l) performs a right shift of l bits of z on each share of z.

6. The method of claim 5, further comprising:

calculating $$\hat{t}_x = \{0, \ldots, 0\},$$

$$\hat{t}_y = \{0, \ldots, 0\}.$$

calculating for all values of j from 0 to k−1

$$\hat{t}_x = \text{sharewiseOR}(\hat{t}_x, \text{sharewiseLSL}(\hat{x}_{k-i+j}, j)), \text{ and}$$

$$\hat{t}_y = \text{sharewiseOR}(\hat{t}_y, \text{sharewiseLSL}(\hat{y}_{k-i+j}, j))$$

where $\hat{t}_x$ is a first temporary variable, $\hat{t}_y$ is a second temporary variable, j is an index, k is the number of coefficients processed in parallel, i is an index value, sharewiseOR is a function that performs a bitwise OR on the shares of the inputs, and the function sharewiseLSL(z, l) performs a left shift of l bits of z on each share of z.

7. The method of claim 6, wherein combining the first bitsliced bits and the second bitsliced bits further comprises:

calculating for all values of j from 0 to k−1

$$\hat{c} = \text{maskedAND}(\hat{c}, \text{maskedAND}(\hat{t}_x, \hat{t}_y))$$

where $\hat{c}$ is the shared output indicating that the first polynomial would compress to a bitstream matching the bitstream representing the second compressed polynomial and the function maskedAND performs a masked bitwise AND of the inputs.

8. The method of claim 7, wherein combining the first bitsliced bits and the second bitsliced bits further comprises repeatedly ANDing the upper and lower bits of each the shares of $\hat{c}$ together until a single bit per share results.

9. The method of claim 7, wherein combining the first bitsliced bits and the second bitsliced bits further comprises ANDing all of the bits of each of the shares of $\hat{c}$ together until a single bit per share results.

10. The method of claim 1, wherein the modulus is a prime number.

11. A data processing system comprising instructions embodied in a non-transitory computer readable medium, the instructions for securely comparing a first polynomial represented by a plurality of arithmetic shares and a second compressed polynomial represented by a bitstring where the bits in the bitstring correspond to coefficients of the second polynomial to perform a cryptographic operation in a processor, the instructions, comprising:

instructions for performing a first masked shift of the shares of the coefficients of the first polynomial based upon the start of the interval corresponding to the compressed coefficient of the second polynomial and a modulus value;

instructions for performing a second masked shift of the shares of the coefficients of the first polynomial based upon the end of the interval corresponding to the compressed coefficient of the second polynomial;

instructions for bitslicing the most significant bit of the first masked shift of the shares coefficients of the first polynomial;

instructions for bitslicing the most significant bit of the second masked shift of the shares coefficients of the first polynomial; and instructions for combining the first bitsliced bits and the second bitsliced bits using an AND function to produce an output including a plurality of shares indicating that the first polynomial would compress to a bitstream matching the bitstream representing the second compressed polynomial.

12. The data processing system of claim 11, wherein instructions for performing a first masked shift of the shares of the coefficients of the first polynomial further comprises:
instructions for calculating $x_i = a_i$, and $x_i^{(0)} = (x_i^{(0)} + 2^{\lceil \log_2(q) \rceil - 1} - s) \bmod q$ where $a_i$ is the arithmetic shares of the $i^{th}$ coefficient of the first polynomial a, q is the modulus, and s is the start of the interval of values compressing to bit values in $b_i$ associated with the $i^{th}$ coefficient of the compressed polynomial.

13. The data processing system of claim 12, wherein instructions for performing a second masked shift of the shares of the coefficients of the first polynomial further comprises:
instructions for calculating $y_i = a_i$, and $y_i^{(0)} = (y_i^{(0)} - e) \bmod q$ where e is the end of the interval of values compressing to bit values in b associated with the $i^{th}$ coefficient of the compressed polynomial.

14. The data processing system of claim 13, further comprising:
instructions for calculating $\hat{x}_i = A2B(x_i)$ and $\hat{y}_i = A2B(y_i)$, where the function A2B converts arithmetic shares of the input into Boolean shares, $\hat{x}_i$ is the Boolean shared first masked shift of the coefficients of the first polynomial, and $\hat{y}_i$ is the Boolean shared second masked shift of the coefficients of the first polynomial.

15. The data processing system of claim 14, wherein instructions for bitslicing the most significant bit of the first masked shift of the shares coefficients of the first polynomial includes instructions for calculating $\hat{x}_i = \text{sharewiseLSR}(\hat{x}_i, \lceil \log_2(q) \rceil - 1)$, and instructions for bitslicing the most significant bit of the second masked shift of the shares coefficients of the first polynomial includes instructions for calculating $\hat{y}_i = \text{sharewiseLSR}(\hat{y}_i, \lceil \log_2(q) \rceil - 1)$, where the function sharewiseLSR(z, l) performs a right shift of l bits of z on each share of z.

16. The data processing system of claim 15, further comprising:
instructions for calculating $\hat{t}_x = \{0, \ldots, 0\}$, $\hat{t}_y = \{0, \ldots, 0\}$.

instructions for calculating for all values of j from 0 to k−1

$\hat{t}_x = \text{sharewiseOR}(\hat{t}_x, \text{sharewiseLSL}(\hat{x}_{k \cdot i + j}, j))$, and $\hat{t}_y = \text{sharewiseOR}(\hat{t}_y, \text{sharewiseLSL}(\hat{y}_{k \cdot i + j}, j))$ where $\hat{t}_x$ is a first temporary variable, $\hat{t}_y$ is a second temporary variable, j is an index, k is the number of coefficients processed in parallel, i is an index value, sharewiseOR is a function that performs a bitwise OR on the shares of the inputs, and the function sharewiseLSL(z, l) performs a left shift of l bits of z on each share of z.

17. The data processing system of claim 16, wherein instructions for combining the first bitsliced bits and the second bitsliced bits further comprises:
instructions for calculating for all values of j from 0 to k−1

$\hat{c} = \text{maskedAND}(\hat{c}, \text{maskedAND}(\hat{t}_x, \hat{t}_y))$ where $\hat{c}$ is the shared output indicating that the first polynomial would compress to a bitstream matching the bitstream representing the second compressed polynomial and the function maskedAND performs a masked bitwise AND of the inputs.

18. The data processing system of claim 17, wherein instructions for combining the first bitsliced bits and the second bitsliced bits further comprises instructions for repeatedly ANDing the upper and lower bits of each the shares of ĉ together until a single bit per share results.

19. The data processing system of claim 17, wherein instructions for combining the first bitsliced bits and the second bitsliced bits further comprises instructions for ANDing all of the bits of each of the shares of ĉ together until a single bit per share results.

20. The data processing system of claim 11, wherein the modulus is a prime number.

* * * * *